(12) United States Patent  
Burtch

(10) Patent No.: US 8,391,557 B2
(45) Date of Patent: Mar. 5, 2013

(54) OBJECT DETECTION AND RANGING METHOD

(75) Inventor: Matthew T. Burtch, Concord, CA (US)

(73) Assignee: Magna International Inc., Aurora (CA)

( * ) Notice: Subject to any disclaimer, the term of this patent is extended or adjusted under 35 U.S.C. 154(b) by 357 days.

(21) Appl. No.: 12/677,586

(22) PCT Filed: Sep. 12, 2008

(86) PCT No.: PCT/CA2008/001616
§ 371 (c)(1),
(2), (4) Date: Jun. 30, 2010

(87) PCT Pub. No.: WO2009/033286
PCT Pub. Date: Mar. 19, 2009

(65) Prior Publication Data
US 2010/0260382 A1    Oct. 14, 2010

Related U.S. Application Data

(60) Provisional application No. 60/993,911, filed on Sep. 14, 2007.

(51) Int. Cl.
*G06K 9/00* (2006.01)

(52) U.S. Cl. ........................................ 382/104

(58) Field of Classification Search .......... 382/100–107; 340/907–915, 933–940; 348/113–115; 701/1, 701/23, 301
See application file for complete search history.

(56) References Cited

U.S. PATENT DOCUMENTS

| | | |
|---|---|---|
| 5,983,161 A | 11/1999 | Lemelson et al. |
| 6,226,389 B1 | 5/2001 | Lemelson et al. |
| 6,275,773 B1 | 8/2001 | Lemelson et al. |
| 6,906,639 B2 | 6/2005 | Lemelson et al. |
| 7,295,154 B2 | 11/2007 | Walton et al. |
| 2003/0083790 A1* | 5/2003 | Hattori et al. ............... 701/1 |
| 2004/0252864 A1* | 12/2004 | Chang et al. .............. 382/104 |
| 2007/0217780 A1* | 9/2007 | Hirooka et al. ............ 396/287 |

* cited by examiner

*Primary Examiner* — Atiba O Fitzpatrick
(74) *Attorney, Agent, or Firm* — Warn Partners, P.C.

(57) ABSTRACT

The present invention relates to a method for object detection and ranging within a vehicles rearward field of interest which includes an algorithm to translate images provided by an imaging device. An image device provides images to a processor which divides the images into groups of rows of pixels. The rows are processed by the algorithm which includes assigning each pixel in the rows to an object. The translation of the image from outside of the vehicle is provided to the vehicle operator and includes the tracking of location and dimensions of multiple objects within the viewing range.

19 Claims, 5 Drawing Sheets

OBJECT DETECTION AND RANGING METHOD

CROSS-REFERENCE TO RELATED APPLICATIONS

This application claims the benefit of U.S. Provisional Application No. 60/993,911 filed Sep. 14, 2007. The disclosure of which is incorporated herein by reference.

FIELD OF THE INVENTION

The present invention relates to an object detection and ranging system and, more particularly, to a method using an algorithm to process three dimensional data imaging for object tracking and ranging.

BACKGROUND OF THE INVENTION

Vehicle park-aid systems are generally known and are commonly used for the purpose of assisting vehicle operators in parking a vehicle by alerting the operator of potential parking hazards. Typical park-aid systems include ultrasonic or camera systems. Ultrasonic systems can alert the vehicle operator of the distance between the vehicle and the closest particular object. However, ultrasonic systems do not recognize what the objects are, do not give the dimensions, and also fail to track multiple objects at the same time. Camera systems can present the vehicle operator with the view from behind the vehicle, however, camera systems do not provide the operator with the distance to the objects viewed, object dimensions, and do not differentiate whether or not the viewed objects are within the vehicle operator's field of interest.

Accordingly, there exists a need for a more advanced object detection and ranging method which can filter and process data provided by a three dimensional camera to provide an effective and comprehensive translation of object information to a vehicle operator.

SUMMARY OF THE INVENTION

The present invention is directed to a method of using an algorithm for object detection and ranging of objects within a vehicle's field of interest. An imaging device captures an image of the rearward area outside of the vehicle. A data processor divides the data into individual rows of pixels for processing and uses an algorithm to assign each pixel in the rows to an object in the field of interest. The data can also be selectively discarded or filtered out, e.g., a pixel mapped threshold to eliminate or discard a surface, ground surface, bumper, object, and the like. A real world translation of the object data and their respective coordinates, including dimensions and distance from the vehicle for all the objects, is performed and communicated to the vehicle's operator. The location and dimensions of the detected objects are thereby made available to the vehicle operator to provide a detailed warning of all objects within the field of interest.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
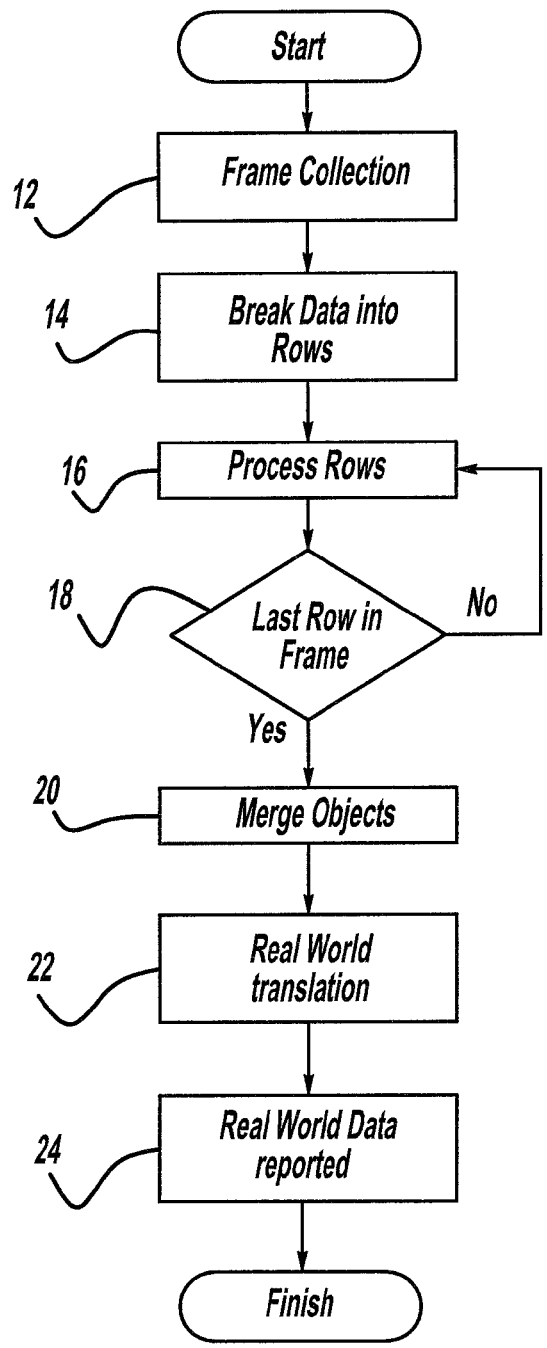
FIG. 1 is a flow diagram depicting a method of operation of an object detection and ranging algorithm, according to the present invention.

Referring to FIG. 1, a flow diagram depicting a method of using an algorithm for object detection and ranging is shown generally at 10. An imaging device, e.g., a three dimensional imaging camera, generates an image including any objects located outside of a vehicle within the field of interest being monitored, e.g., a generally rearward area or zone behind a vehicle. A frame of this image is operably collected at a first step 12 by a data processor which divides or breaks the data from the collected frame into groups of rows of pixels at a second step 14. The rows are operably processed at third step 16 by an algorithm, shown in FIG. 2, which includes assigning each pixel in the rows to one or more respective objects in the field of interest. By way of non-limiting example, it could be determined that multiple objects exist within the field of interest. At fourth step 18, the processor determines whether each row has been processed, and processes any remaining rows until all rows are evaluated. At fifth step 20, objects determined to be in such proximity with each other as to be capable of being part of the same object, e.g., a curb, light pole, and the like, are operably merged. At sixth step 22, three-dimensional linear algebra and the like is used to provide a "real world" translation of the objects detected within the field of interest, e.g., to provide object dimensions, coordinates, size, distance from the rear of the vehicle and the like. The real world translation is operably reported to the vehicle operator at seventh step 24. The object detection and ranging method 10 thereby operably alerts the vehicle operator about potential obstacles and contact with each respective object in the field of interest.

Figure 2:
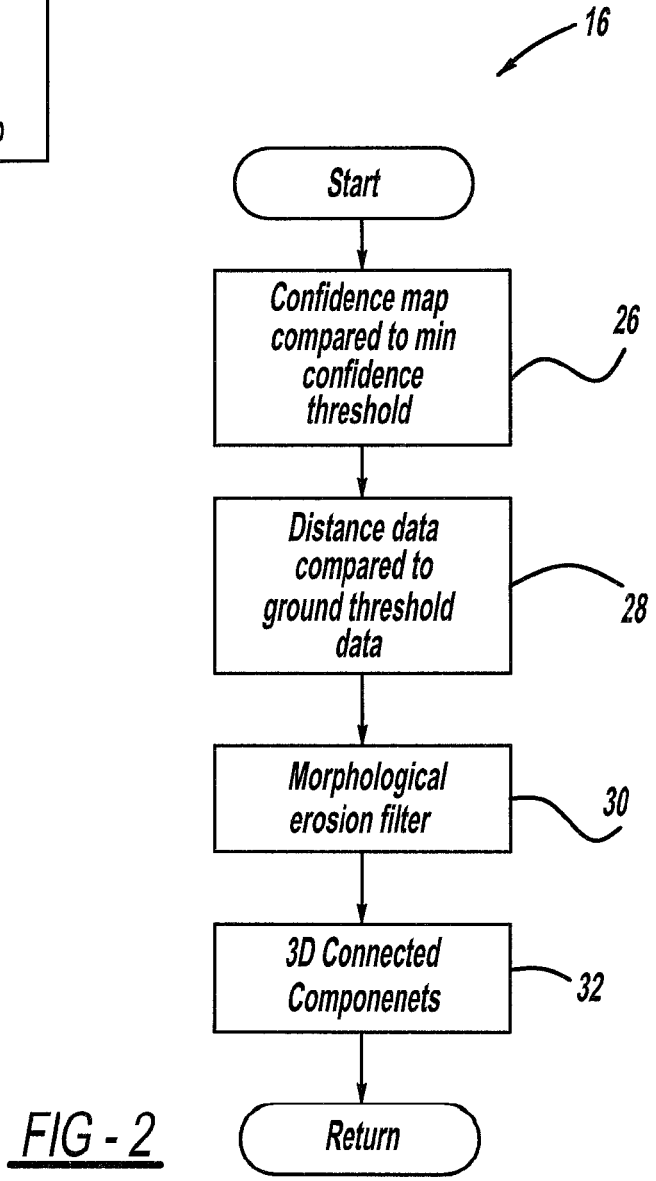
FIG. 2 is a flow diagram depicting an algorithm for row processing, according to the present invention.

Referring to FIGS. 2 to 5 in general, and more specifically to FIG. 2, a flow diagram is depicted illustrating the algorithm for third step 16 in which each row is processed in order to assign each pixel in the rows to an object in the field of interest. The third step 16 generally requires data from the current row, the previous row, and the next row of pixels, wherein the current row can be the row where the current pixel being evaluated is disposed. Typically, the rows of pixels can include data collected from generally along the z-axis, "Z," extending along the camera's view.

The row processing algorithm shown at 16 generally has four processing steps each including the use of a respective equation, wherein completion of the four processing steps allows the current pixel being evaluated, herein called a "pixel of interest," to be assigned to an object. A first processing step 26 and a second processing step 28 are threshold comparisons based on different criteria and equations. The first processing step 26 and second processing step 28 can use equation 1 and equation 2 respectfully. A third processing step 30 and a fourth processing steps 32 are spatial operations based on different criteria and equations performed on the pixel of interest. The third processing step 30 and fourth processing step 32 can use equation 3 and equation 4 respectfully. The first and second processing steps 26,28 must be performed before the third and fourth processing steps 30,32 as data from the first and second processing steps 26,28 is required for the third and fourth processing steps 30,32. Outlined below are samples of equations 1 and 2 used in carrying out the first and second processing steps 26,28 respectively and equations 3 and 4 used in carrying out the third and fourth processing steps 30,32 respectively.

$$Z_{(r+1,c+1)} = \begin{cases} 0 : \text{Confidence}_{(r+1,c+1)} < ConfidenceThreshold \\ Z_{(r+1,c+1)} : \text{otherwise} \end{cases} \quad \text{Equation 1}$$

Where Confidence Threshold can be a predetermined constant $$Z_{(r+1,c+1)} = \begin{cases} 0 : Z_{(r+1,c+1)} > GroundThreshold_{(r+1,c+1)} \\ Z_{(r+1,c+1)} : \text{otherwise} \end{cases} \quad \text{Equation 2}$$

Where Ground Threshold can be a pixel mapped threshold $$Z_{(r,c)} = \begin{cases} Z_{(r,c)} : Z_{(r,c+1)}, Z_{(r+1,c+1)} > 0 \\ 0 : \text{otherwise} \end{cases} \quad \text{Equation 3}$$

Where $(r, c)$ is a pixel of interest $$Obj_{(r,c)} = \begin{cases} Obj_{(r+i,c+j)} : |Z_{(r,c)} - Z_{(r+i,c+j)}| < \text{MIN\_DIST} \\ NewObjAssignment : (Obj_{(r+i,c+j)} = \\ \quad \text{invalid} \| Z_{(r,c)} - Z_{(r+i,c+j)}| > \text{MIN\_DIST}) \\ \quad \& Obj_{(r,c)} = \text{unassigned} \\ \text{invalid} : Z_{(r,c)} = 0 \\ Obj_{(r,c)} : \text{otherwise} \end{cases} \quad \text{Equation 4}$$

Where $i, j = \{-1, 1\}$
$Obj_{(r,c)}$ is an object to which the pixel of interest was assigned.
$(r, c)$ is a pixel of interest.

The first and second processing steps 26,28 are generally filtering or point based operations which operate on a pixel disposed one row ahead and one column ahead of the pixel of interest being evaluated for assignment to an object. The first processing step 26 uses equation 1 and includes comparing a confidence map to a minimum confidence threshold. The first processing step 26 determines a confidence factor for each pixel of the collected frame to show reliability of the pixel data collected along the z-axis. The confidence factor is compared to a static threshold, e.g., a predetermined constant, and the data is filtered. The second processing step 28 uses equation 2 and includes comparing distance data to ground threshold data. The second processing step 28 compares the data, e.g., pixel data, collected along the z-axis to a pixel map of a surface, e.g., the ground surface rearward of the vehicle upon which the vehicle travels. This allows the surface, e.g., ground surface, in the captured image to be filtered out or ignored by the algorithm. It is understood that additional surfaces or objects, e.g., static objects, the vehicle bumper, hitch, rear trim, and the like, can be included in the pixel map of the surface such that they too can be filtered out or discarded by the algorithm.

The third and fourth processing steps 30,32 are generally spatial operations or processes performed on the pixel of interest in order to assign the pixel of interest to an object. The third processing step 30 uses equation 3 and is a morphological erosion filter used to eliminate and discard single pixel noise, e.g., an invalid, inaccurate, unreliable, and the like pixel of interest. This step requires that the data in the forward adjacent pixels, e.g., r+m, c+n, of the collected frame be present and valid in order for the pixel of interest to be valid. The fourth processing step 32 uses equation 4 and includes a three dimensional ("3D") connected components algorithm which groups together objects based on a minimum distance between the z-axis data of the pixel of interest and the z-axis data of pixels adjacent to the pixel of interest which have already been assigned to objects. The 3D connected components algorithm requires that the pixel of interest be compared to the backward pixels, e.g., r-m, c-n. Equation 4 can depict the result of the algorithm, however, it is understood that the implementation can differ. By way of non-limiting example, equation 4 can ignore the merging of objects, e.g., of step 20, and assign pixels of interest to new objects and re-assign the pixels if necessary.

Figure 3A:
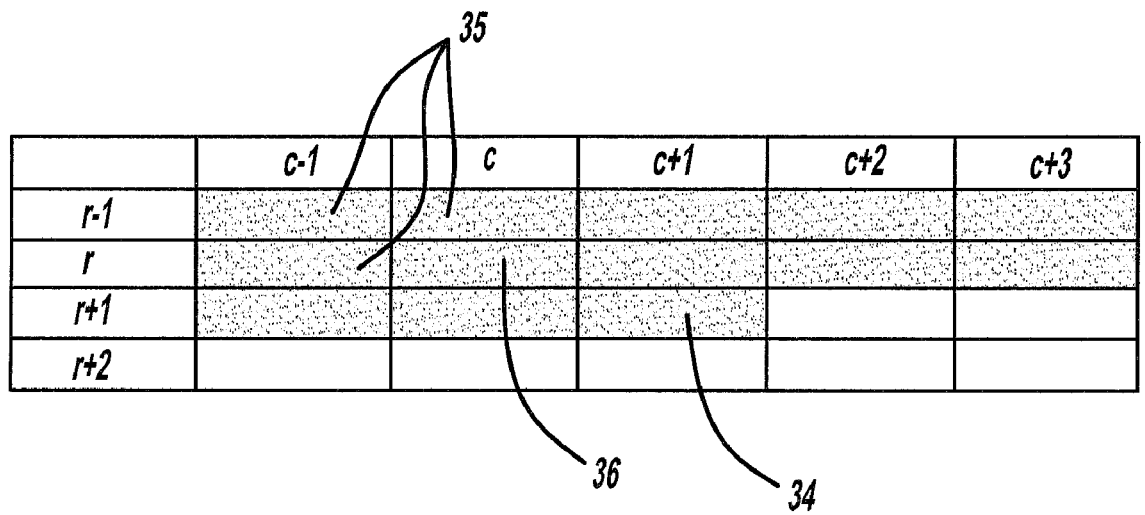
FIG. 3(a) is a grid illustrating point operations and spatial operations performed on particular pixels, according to the present invention.
Figure 3B:
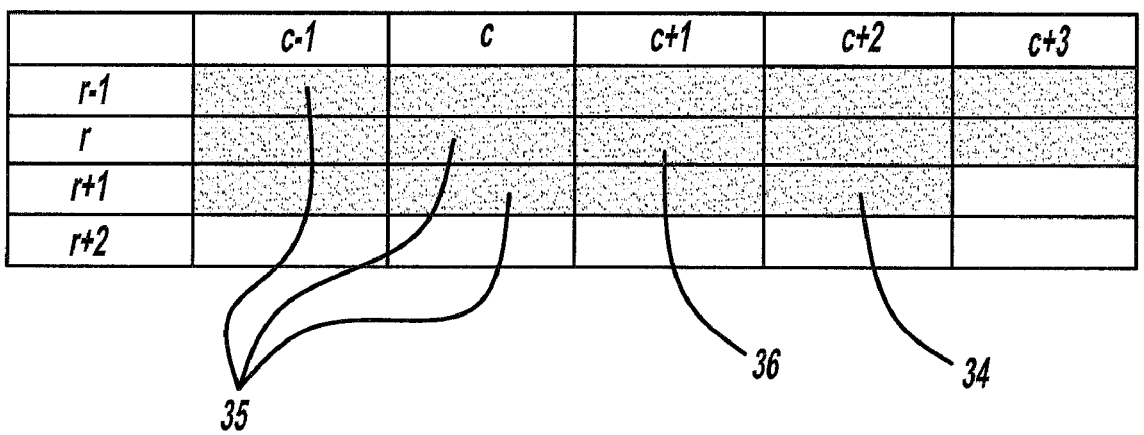
FIG. 3(b) is a grid illustrating point operations and spatial operations performed on particular pixels, according to the present invention.

FIGS. 3(a) and 3(b) each show an example of a pixel that is being filtered, shown at 34, using the first and second processing steps 26,28, and a pixel of interest, shown at 36, that is being assigned to an object using the third and fourth processing steps 30,32. By way of non-limiting example, FIGS. 3(a) and 3(b) each depict a two-dimensional grid with squares representing pixels in which the pixels have been divided into groups of rows of pixels, by step 14, having four rows and five columns. Referring to FIG. 3(a), a pixel of interest, shown at 36, is disposed at a row, "r", and at column, "c." The pixel being filtered, shown at 34, is disposed one row ahead, "r+1", and one column ahead, "c+1", of the pixel of interest at r,c. Pixels shown at 35 illustrate pixels that have gone through filtering operations using the first and second processing steps 26,28. Referring to FIG. 3(b), a pixel of interest, shown at 36, is disposed at a row, "r", and at column, "c+1." The pixel being filtered, shown at 34, is disposed one row ahead, "r+1", and one column ahead, "c+2", of the pixel of interest at r,c+1. Pixels shown at 35 illustrate pixels that have gone through filtering operations using the first and second processing steps 26,28. For example, the illustrated pixels of interest disposed at r,c and r,c+1 respectively may be assigned to one or more objects in the field of interest upon completion of the spatial operations of the third and fourth processing steps 30,32.

Figure 4:
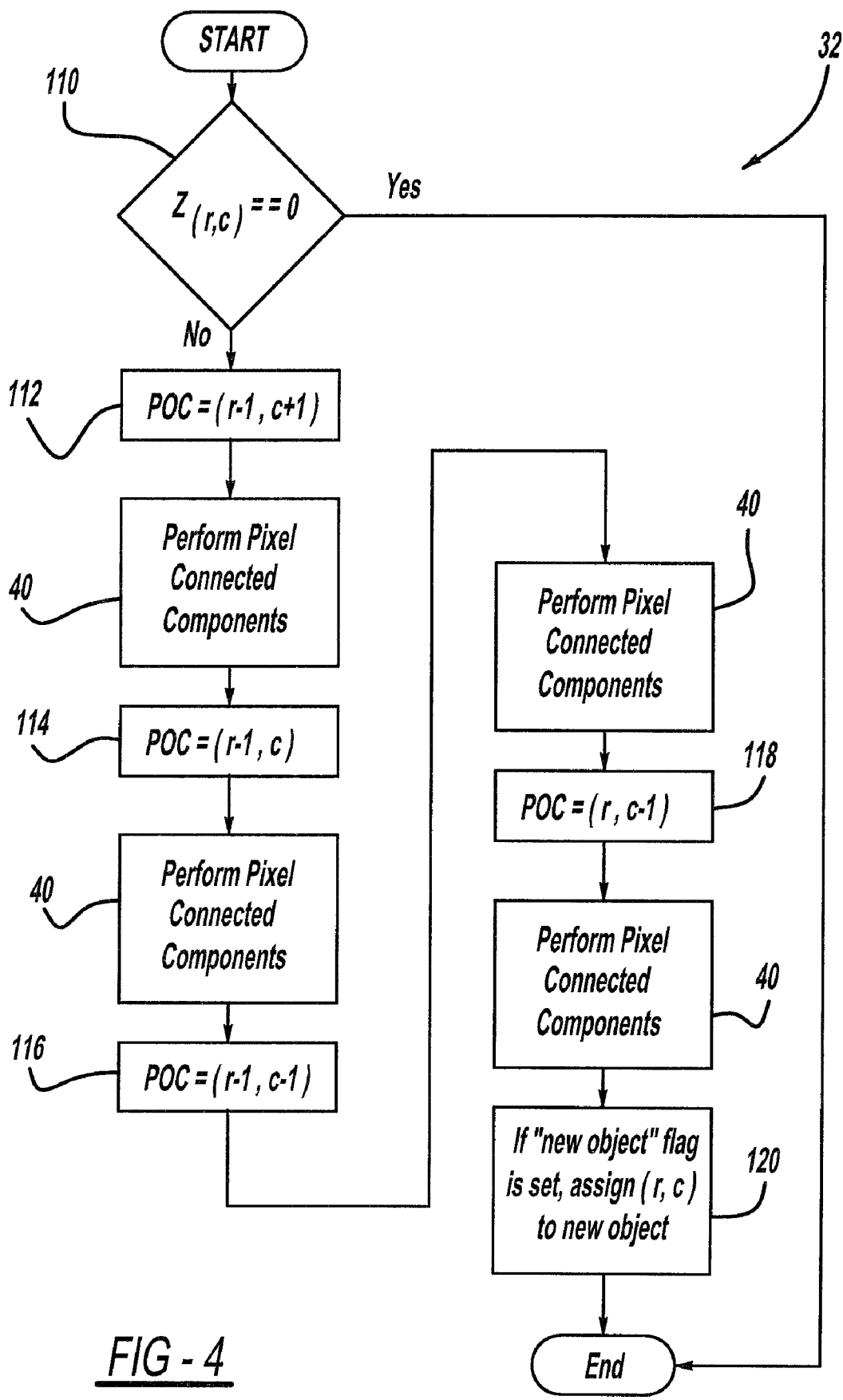
FIG. 4 is a flow diagram illustrating a three dimensional connected components algorithm of FIG. 2, according to the present invention.
Figure 5:
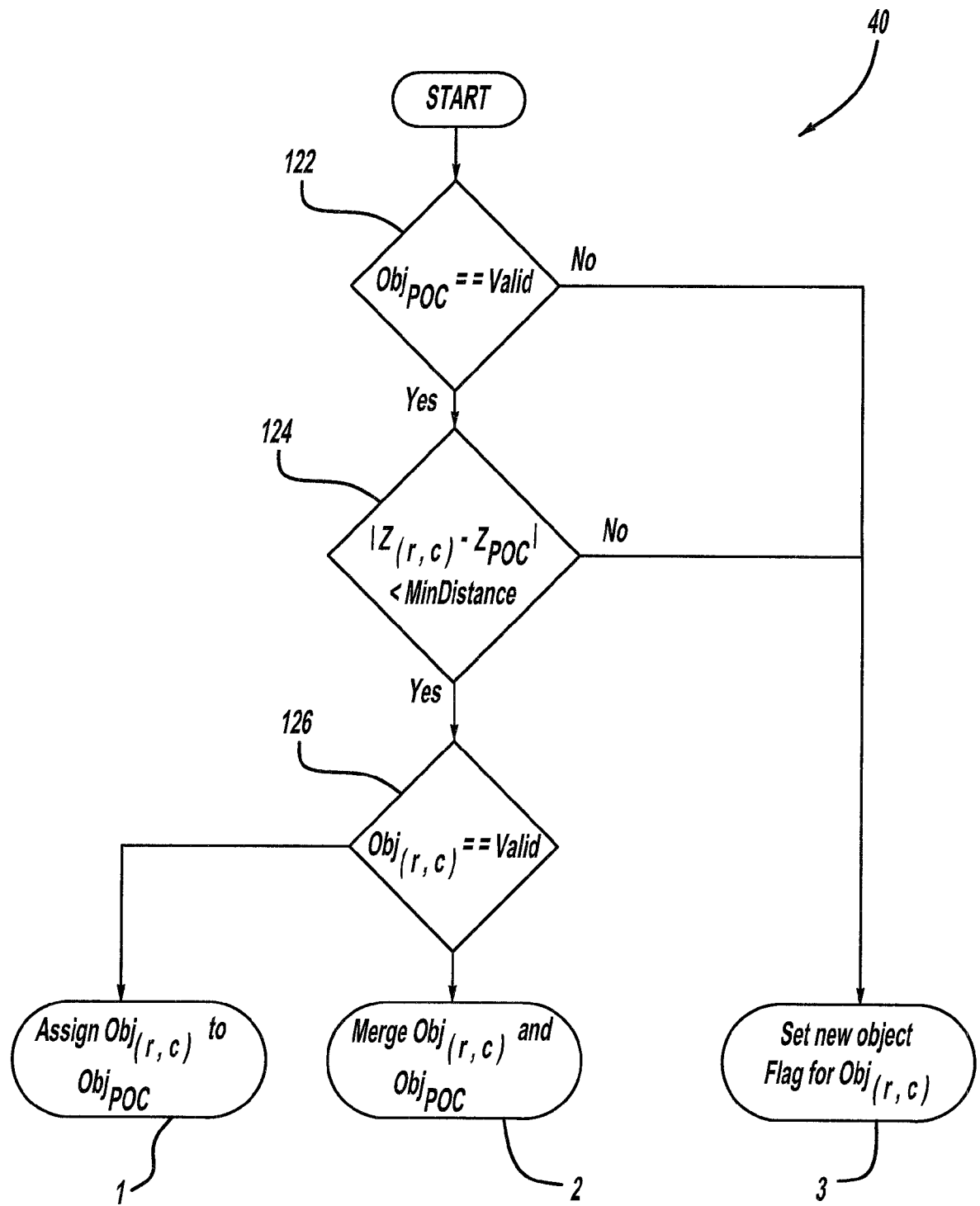
FIG. 5 is a flow diagram illustrating a pixel connected components algorithm of FIG. 4, according to the present invention.

Referring generally to FIGS. 2 and 4, and specifically to FIG. 4, there is depicted a flow chart diagram for the 3D connected components algorithm, shown generally at 32. In general, row processing steps one through three 26, 28, and 30 (shown in FIG. 2) should be performed before conducting the 3D connected components 32 algorithm. This allows a pixel of interest to be compared only with pixels that have already been assigned to objects. By way of non-limiting example, the pixel of interest, shown as "(r,c)" is disposed at row "r" and column "c." At step 110, if and only if the depth data for the pixel of interest, "Z(r,c)," is zero, then proceed to step 18 of the object detection and ranging algorithm 10 (shown in FIG. 1). If the depth data for the pixel of interest, "Z(r,c)," is not zero, then proceed to step 112. By way of non-limiting example, a pixel of comparison ("POC"), shown as "POC" in FIG. 4, is disposed at row "r−1" and column "c+1" and a pixel connected components algorithm 40 is performed (shown in the flow chart diagram of FIG. 5). At step 114, the pixel of comparison is disposed at r−1 and c and the pixel connected components algorithm 40 depicted in FIG. 5 is performed. At step 116, the pixel of comparison is disposed at r−1 and c−1 and the pixel connected components algorithm 40 depicted in FIG. 5 is performed. At step 118, the pixel of comparison is disposed at r and c−1 and the pixel connected components algorithm 40 depicted in FIG. 5 is performed. If performance of this last pixel connected components algorithm 40 sets a new object flag for the object to which the pixel of interest was assigned, "Obj(r,c)", then at step 120 the pixel of interest, "(r,c)", is assigned to a new object. The object detection and ranging algorithm 10 then determines at decision 18 if the last row in the frame has been processed. As illustrated in FIG. 4, the pixel connected components algorithm 40 can be performed four times for each pixel of interest before moving on to the next pixel of interest to be evaluated. It is understood that the 3D connected components algorithm 32 can help provide a translation of the field of interest relative to a vehicle including tracking of multiple objects and providing information including distance, dimensions, geometric centroid and velocity vectors and the like for the objects within the field of interest.

Referring generally to FIGS. 4 and 5, and specifically to FIG. 5, there is depicted a flow chart diagram for the pixel connected components algorithm, shown generally at 40. In general, through the pixel connected components algorithm 40, pixels can be grouped into three states 1, 2, 3. The first state 1 typically assigns the object to which the pixel of interest was assigned, "Obj(r,c)", to the object to which the pixel of comparison is also assigned "Obj(POC)". The second state 2 typically merges the object to which the pixel of interest was assigned with the object to which the pixel of comparison was assigned. By way of non-limiting example, where it is determined that pixels assigned to objects substantially converge in relation to the z-axis as the axis nears the imaging device, the pixels can be merged as one object (depicted in the flow chart diagram of FIG. 6). The third state 3 typically sets a new object flag for the object to which the pixel of interest was assigned, e.g., at least preliminarily notes the object as new if the object cannot be merged with another detected object. It is understood that the objects to which the respective pixels of interest are assigned can change upon subsequent evaluation and processing of the data rows and frames, e.g., objects can be merged into a single object, divided into separate objects, and the like.

At first decision 122 of the pixel connected components algorithm 40, if and only if the object to which a pixel of comparison was assigned is not valid, e.g., deemed invalid by third processing step 30, not yet assigned, is pixel noise, and the like, then a new object flag is set for the object to which the pixel of interest, ("r,c"), was assigned at State 3. If the object to which a pixel of comparison was assigned is valid, then second decision 124 is performed. At second decision 124, if the depth data for the pixel of interest, "Z(r,c)", minus the depth data for the pixel of comparison, "Z(POC)" is less than the minimum distance, then third decision 126 is performed, e.g., minimum distance between the z-axis data of the pixel of interest and the z-axis data of pixels adjacent to the pixel of interest. If not, then the object to which the pixel of interest was assigned is set or flagged as new at state 1. At third decision 126, if and only if the object to which the pixel of interest was assigned is valid, then the processor either selectively assigns the object to which the pixel of interest was assigned to the object to which the object to with the pixel of comparison was assigned at state 1, or selectively merges the object to which the pixel of interest was assigned with the object to which the pixel of comparison was assigned at state 2 (shown in FIG. 6).

Referring to FIG. 1, the processor determines whether each row has been processed at fourth step 18 and repeats the third and fourth steps 16,18 until all of the rows are processed. Once all of the rows are processed the object data that each pixel was assigned to represents all objects detected along the camera's view, e.g., one or more objects detected. These objects can be merged at fifth step 20, wherein objects that are determined to be in operable proximity with each other as to be capable of being part of the same object are operably merged. It is understood that objects that were detected as separate, e.g., not in proximity with each other, during a first sweep or collection of a frame of the imaging device can be merged upon subsequent sweeps if it is determined that they operably form part of the same object.

Figure 6:
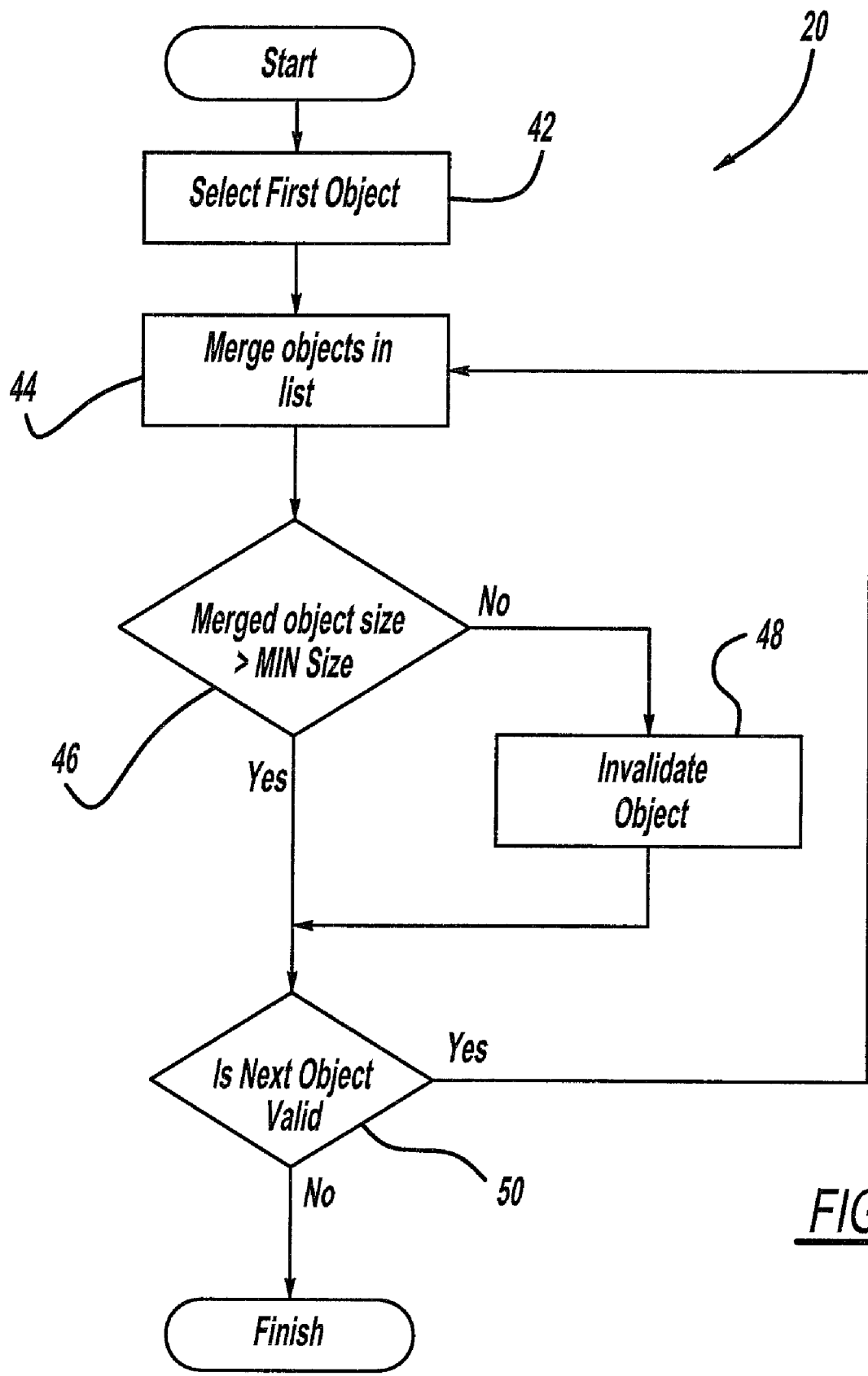
FIG. 6 is a flow diagram illustrating an algorithm for merging objects, according to the present invention.

Referring to FIG. 6, a flow diagram illustrating an algorithm for merging objects, is shown generally at 20, e.g., merging objects to combine those that were initially detected as being separate. In general, the object to which the pixel of interest object was assigned and the object to which the pixel of comparison was assigned can be merged. By way of non-limiting example, where it is determined that pixels assigned to objects substantially converge in relation to the z-axis as the axis nears the imaging device during a single or multiple sweeps of the field of interest by the imaging device, the pixels can be merged as one object. At first merge step 42, the data processor selects a first object, e.g., an object to which the pixel of interest was assigned. At second merge step 44, the first object is selectively merged with a detected or listed object, e.g., an object to which respective pixels of interest are assigned, to selectively form a merged object. At third merge decision 46, if the size of a respective merged object is not greater than the minimum size of the first object, then the first object is invalidated at invalidation step 48, e.g., the first object will not be considered as being in such proximity with that particular detected or listed object as to be capable of being part of the same object. If the size of a respective merged object is greater than the minimum size of the first object, then fourth merge decision 50 is performed. At fourth merge decision 50, if the next object to which a respective pixel of comparison is assigned is valid, then perform the second and third merge steps 44,46. If at fourth merge decision 50 the next object to which a respective pixel of comparison is assigned is not valid, then the algorithm for merging objects, shown generally at 20, is ended and the real world translation at fifth step 22 is performed (shown in FIG. 1).

Referring to FIG. 1, at sixth step 22, three-dimensional linear algebra and the like is used to provide the real world translation of the objects detected within the field of interest, e.g., object dimensions, location, distance from the vehicle, geometric centroid, velocity vectors, and the like, and combinations thereof, is performed and communicated to the vehicle's operator. This real world translation is operably reported to the vehicle operator at seventh step 24 to provide a detailed warning of all objects to thereby alert the vehicle operator about potential obstacles and contact with each respective object in the field of interest.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An object detection and ranging method for a motor vehicle, comprising the steps of:

providing an imaging device;
providing a data processor for interpreting a captured image of a field of interest provided by the imaging device;
processing rows of pixels;
comparing pixel data collected by said data processor to a pixel map of one or more surfaces to filter out and discard said surfaces; and
reporting a real world translation to a vehicle operator, wherein said real world translation includes at least object dimensions and distance from the vehicle for all objects in said field of interest;
wherein processing said rows further comprises a morphological erosion filter for filtering out and discarding pixel noise.

2. The object detection and ranging method for a motor vehicle of claim 1, wherein said imaging device is a three dimensional imaging camera.

3. The object detection and ranging method for a motor vehicle of claim 1, further comprising the step of said data processor collecting a frame of said captured image and breaking data from said collected frame into groups of rows of pixels for processing said rows of pixels to operably assign each respective pixel in a row to one or more objects in said field of interest.

4. The object detection and ranging method for a motor vehicle of claim 1, wherein said data processor processes rows of pixels using first and second processing steps that are point based operations to filter out pixel data.

5. The object detection and ranging method for a motor vehicle of claim 1, wherein said data processor processes rows of pixels using third and fourth processing steps that are spatial operations performed on each respective pixel of interest in said row to assign said pixel of interest to an object in said field of interest.

6. The object detection and ranging method for a motor vehicle of claim 1, further comprising the step of selectively merging objects determined during one or more sweeps of said field of interest by said imaging device to be in such proximity with one another as to be part of the same object.

7. The object detection and ranging method for a motor vehicle of claim 1, wherein said reported real world translation is selected from the group consisting of object location, geometric centroid, velocity vector, dimensions, size, distance from the vehicle, and combinations thereof.

8. An object detection and ranging method for a motor vehicle, comprising the steps of:
providing an imaging device to selectively capture an image of a field of interest;
providing a data processor to operably collect a frame of said captured image;
breaking data from said collected frame into groups of rows of pixels;
processing said rows of pixels to operably assign each respective pixel in a row to one or more objects in the field of interest until every row of pixels is processed;
generating a real world translation of said one or more objects; and
reporting said real world translation to a vehicle operator, wherein said real world translation includes at least object dimensions and distance from the vehicle for all objects in said field of interest;
wherein processing said rows further comprises a morphological erosion filter for filtering out and discarding pixel noise.

9. The object detection and ranging method for a motor vehicle of claim 8, wherein said imaging device is a three dimensional imaging camera.

10. The object detection and ranging method for a motor vehicle of claim 8, wherein processing said rows further comprises first and second processing steps that are point based operations to filter pixel data.

11. The object detection and ranging method for a motor vehicle of claim 8, wherein processing said rows further comprises first and second processing steps, wherein said second processing step compares pixel data collected by said data processor to a pixel map of one or more surfaces to filter out and discard said surfaces.

12. The object detection and ranging method for a motor vehicle of claim 8, wherein processing said rows further comprises third and fourth processing steps that are spatial operations performed on each respective pixel of interest in said row to assign said pixel of interest to an object in said field of interest.

13. The object detection and ranging method for a motor vehicle of claim 8, further comprising the step of selectively merging objects determined during one or more sweeps of said field of interest by said imaging device to be in such proximity with one another as to be part of the same object.

14. The object detection and ranging method for a motor vehicle of claim 8, wherein said reported real world translation is selected from the group consisting of object location, geometric centroid, velocity vector, dimensions, size, distance from the vehicle, and combinations thereof.

15. An object detection and ranging method for a motor vehicle, comprising the steps of:
providing an imaging device to selectively capture an image of a field of interest;
providing a data processor to operably collect a frame of said captured image;
breaking data from said collected frame into groups of rows of pixels;
processing said rows of pixels to operably assign each respective pixel in a row to one or more objects in the field of interest until every row of pixels is processed, wherein said processing said rows includes comparing pixel data collected by said data processor to a pixel map of one or more surfaces to filter out and discard said surfaces;
merging objects determined to be in such proximity with one another as to be part of the same object
generating a real world translation of said one or more objects; and
reporting said real world translation to a vehicle operator, wherein said real world translation includes at least object dimensions and distance from the vehicle for all objects in said field of interest,
wherein processing said rows further comprises a morphological erosion filter for filtering out and discarding pixel noise.

16. The object detection and ranging method for a motor vehicle of claim 15, wherein said imaging device is a three dimensional imaging camera.

17. The object detection and ranging method for a motor vehicle of claim 15, wherein processing said rows further comprises third and fourth processing steps that are spatial operations performed on each respective pixel of interest in said row to assign said pixel of interest to an object in said field of interest.

18. The object detection and ranging method for a motor vehicle of claim 13, further comprising selectively merging objects first determined to be separate objects during one sweep of said field of interest by said imaging device into a single object determined in one or more subsequent sweeps to be in such proximity with one another as to be part of the same object.

19. The object detection and ranging method for a motor vehicle of claim 15, wherein said reported real world translation is selected from the group consisting of object location, geometric centroid, velocity vector, dimensions, size, distance from the vehicle, and combinations thereof.

* * * * *

UNITED STATES PATENT AND TRADEMARK OFFICE
CERTIFICATE OF CORRECTION

| | |
|---|---|
| PATENT NO. | : 8,391,557 B2 |
| APPLICATION NO. | : 12/677586 |
| DATED | : March 5, 2013 |
| INVENTOR(S) | : Burtch |

It is certified that error appears in the above-identified patent and that said Letters Patent is hereby corrected as shown below:

In the Specification

Column 3, Line 8, "fourth processing steps" should be --fourth processing step--.

Column 5, Line 66, Delete "to" and "object with the" and insert --assigned the object to which the pixel of comparison--.

Column 6, Line 48, "fifth step 22" should be --sixth step 22--.

Signed and Sealed this
Twenty-second Day of October, 2013

Teresa Stanek Rea
*Deputy Director of the United States Patent and Trademark Office*